(12) United States Patent
Cave

(10) Patent No.: US 6,175,562 B1
(45) Date of Patent: *Jan. 16, 2001

(54) SWITCHLESS CALL PROCESSING

(75) Inventor: Ellis K. Cave, Garland, TX (US)

(73) Assignee: InterVoice Limited Partnership, Reno, NV (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/846,961

(22) Filed: Apr. 29, 1997

(51) Int. Cl.[7] ................................................... H04L 12/66
(52) U.S. Cl. .................................................... 370/352
(58) Field of Search .................................. 370/352, 353, 370/354, 355, 356, 270; 395/200.31, 200.32, 200.33, 200.34, 200.35, 200.47, 200.48, 200.49; 379/211, 212, 213, 93.12, 265, 266; 709/217, 218, 219

(56) References Cited

U.S. PATENT DOCUMENTS

| | | | |
|---|---|---|---|
| 5,479,487 | * 12/1995 | Hammond | 379/67 |
| 5,671,354 | * 9/1997 | Ito et al. | 395/187.01 |
| 5,742,596 | * 4/1998 | Baratz et al. | 370/356 |
| 5,764,910 | * 6/1998 | Shachar | 395/200.53 |
| 5,848,143 | * 12/1998 | Andrews et al. | 379/219 |
| 5,857,191 | * 1/1999 | Blackwell, Jr. et al. | 707/10 |
| 5,884,032 | * 3/1999 | Bateman et al. | 370/356 |

FOREIGN PATENT DOCUMENTS 0 829 995   3/1998   (EP) .

OTHER PUBLICATIONS

Readme for Microsoft (R) NetMelting (TM) 1.0 Aug. 1996.*
European Search Report dated May 15, 2000.
"Building the ACD–LAN Connection" by Allan Sulkin; from Business Communications Review, vol. 26, No. 6, Jul. 1, 1996.
"When CTI Meets the Internet" by Michael Katz; from Telecommunications, Jan. 1997.
"Details on Display" by Ingo Paszkowsky; from Telecom Report, Jan. 1997.

* cited by examiner

Primary Examiner—Ajit Patel
(74) Attorney, Agent, or Firm—Fulbright & Jaworski L.L.P.

(57) ABSTRACT

A switchless Automatic Call Distribution ("ACD") system distributing incoming calls to call agents networked via a low-cost data network such as an ethernet. Standard POTS calls are received from the Public Switched Telephone Network ("PSTN"), whereupon a POTS/packet gateway digitizes the signal (if necessary) and compresses it, advantageously from $\mu$-law format (64 Kbps) down to approximately 5–6 Kbps. The POTS/packet gateway then converts the signal into a packetized format. Responsive to a call distribution algorithm identifying the next available agent by IP address, the caller's packetized voice signals are distributed to the agent over the ethernet. At the same time, Web-enabled database tools generate "documents," advantageously in html, containing database information regarding the caller. These documents are then distributed to the agent over the ethernet. The agent may then converse with the caller using a headset connected to a standard desktop computer running CODEC software to transmit and receive packetized voice signals. At the same time, the computer runs browser software to allow the agent to receive html documents and send back updated information while talking to the caller. As a result, the ACD system has been optimized into a switchless ethernet connecting agents operating standard desktop computers running low-cost CODEC and browser software.

51 Claims, 3 Drawing Sheets

SWITCHLESS CALL PROCESSING

TECHNICAL FIELD OF THE INVENTION

This invention relates generally to call processing systems, and more particularly to a switch less call processing system in which incoming calls from the public switched telephone network ("PSTN") are converted to packetized voice signals. The voice signals are multiplexed with database information and then distributed to call agents over a low-cost data grade network such as an ethernet.

BACKGROUND OF THE INVENTION

Several emerging telecommunications technologies form the background of this invention.

First, there have been rapid advances in techniques to compress voice signals so as to enable efficient transportation thereof over data grade networks. Although Plain Old Telephone System ("POTS") analog connections still exist, the use of digitized voice transmission is becoming increasingly common on the POTS network. Digitized voice signals transmitted over the Public Switched Telephone Network ("PSTN") normally consume approximately 64 Kbps of bandwidth when digitized and encoded using the standard $\mu$-law algorithm. In contrast, modern CODECs can compress digitized speech to consume as little as 5 Kbps of bandwidth without seriously degrading the voice signal. Further, modern Pentium®-grade processors, as found in most multimedia-grade desktop computers, have ample processing power to run such CODECs, thereby enabling a user to transmit and receive voice signals through the desktop computer using a microphone and speakers attached to the computer.

Second, POTS/packet gateways are becoming increasingly common. POTS lines generally multiplex digitized voice signals by allocating sequential bits or words in separate conversations to periodic time slots in a time division multiple access ("TDMA") structure. The data is transmitted in streaming form. Connections require a switched architecture and point-to-point connections and have a potential for wasted resources when lines are not busy. On the other hand, other data grade networks send digitized voice signals in packetized form, where each bit or word is encoded with a header that references its position in a conversation. The "packets" are then sent out on a routed basis, and may follow one of many possible pathways to their destinations before they are reassembled, according to their headers, into a conversation. This has the slight disadvantage over the POTS/TDMA method in that the headers consume additional bandwidth, but this disadvantage is generally dramatically outweighed over the efficiencies in network usage without switched architecture and point-to-point connections. POTS/packet gateways are resources that convert TDMA voice signals received, for example, over a standard POTS line, into packetized voice signals, and vice versa. Generally, the POTS/packet gateway will also perform conversion of analog signals to digital signals (if required), or accept the $\mu$-law encoded digital signals directly from the PSTN. The gateway then compresses the digitized signals from $\mu$-law (about 64 Kbps) down to about 6 Kbps before packetizing (and vice versa). The packetized voice signals may then be multiplexed with numerous other signals for transmission over a data line. A typical application of such a POTS/packet gateway is in alternatives to making a long distance call. Instead of making a long distance connection where the network uses digital TDMA lines at approximately 64 Kbps of bandwidth per call, callers may make a local POTS call to a POTS/packet gateway. The gateway then digitizes (if necessary) and compresses the incoming signal to a packetized signal compressed down to, for example, 5 or 6 Kbps. These compressed low-bandwidth signals may then be multiplexed and routed in bulk very cheaply over long distances on a data grade network. At the other end, another POTS/packet gateway receives and reassembles the packetized signal, and then decompresses the signal and converts it back into a TDMA-multiplexed signal. Resources at the distant gateway then make another local POTS call to complete the connection between the calling party and the receiving party.

A third emerging technology is the advance in the use of "Web-enabled databases." In these applications, browser software on a standard desktop computer is used as an access method to documents downloadable from a server containing database information also available to that server. A primary feature of this Web-enabled database technology is that, responsive to a remote user's request for particular database information, tools at the server dynamically generate browser-readable documents (often in html) that contain the desired information. In this way, the computer needs only a browser and need not have resident "client" applications software to access and interact with "naked" database information downloaded by itself.

The computer's browser software thus presents the document, allowing the user to adapt (if necessary) the database information or supply other information. When a transaction is complete, the computer sends back the adapted and/or supplied information and discards the document. In this way, just about any standard desktop computer running low-cost browser software may access and interact with a multitude of databases via server-resident tools dynamically creating browser-readable documents containing the databases' information.

Against this background of emerging technologies, traditional automatic call distribution ("ACD") resources continue to require a significant investment in switched networks controlled by, for example, a private branch exchange ("PBX") or a dedicated ACD. As explained in more detail below, and with reference to FIG. 1A, early ACD systems comprised a simple switch receiving POTS calls directly from the PSTN. If agents were free, the ACD connected an incoming call. If not, the caller was put on hold. Agents operated "dumb" data terminals interacting with a central host and accessing a database. There was no control link between the ACD and the host. Thus, agents had to identify the caller upon voice connection and send a request to the host for information. This caused agent connections to be much longer, in turn causing agents to handle fewer calls and callers to spend longer periods of time on the phone.

More recent ACD systems have introduced a voice response unit ("VRU") to screen and categorize incoming calls, routing those calls to agents or other resources responsive to the wishes of the caller. See FIG. 1B, discussed in more detail below. The VRU may be able to handle the needs of a caller robotically, without having to connect the caller to an agent. When the caller wishes to be connected to an agent and all agents are busy, the VRU also keeps holding callers interested by playing information, music, etc. The VRU also allows calls to be directed among several agent pools each having different functions, since a VRU is generally capable of directing calls to several ACDs concurrently. With reference to FIG. 1B, voice pathways to live agents are still switched through an ACD (often a PBX with additional ACD functionality). The ACD may receive calls either directly from the PSTN, or via the VRU. When calls are first received and screened by the VRU, however, caller information (such as caller identity or account number) may be obtained by the VRU prior to connecting with a live agent. A computer/telephony server ("CT Server") is thus disposed between the VRU, the ACD and a database to enable database information regarding a particular caller to be directed to the data terminal of the agent with whom the caller is to be connected. This data is sent in parallel with establishment of the voice path, so that upon voice connection, the agent has the caller's information on the screen in front of her. This enables the agent to handle more calls in a shift, and causes the caller's phone time to be shorter.

Under this more recent model, agents'data terminals have also migrated to a "client/server" paradigm where the database information is exchanged with a server, and client software on agents'computers adapts and presents the data.

The state of the art for ACD systems is nonetheless still dependent on a large and expensive ACD switch, normally integrated with a complex PBX. Under this model, million dollar switch installations are not uncommon. Further, on some ACDs, the database of information often requires each call agent to use proprietary applications software, resident on their data terminals, to access and adapt the database information responsive to the caller's needs. Some ACD systems still require agents to be equipped with a unique proprietary workstation having integrated telephony devices and data terminals.

There is a need in the art to simplify ACD systems by taking advantage of emerging telecommunications technologies as described above. Integration of telephone audio functions with workstation (data exchange) functions will lower the cost of agent station equipment and will reduce the number of network interconnections required for an agent. Clearly, elimination of the switch could dramatically reduce the cost and complexity of current ACD installations. Further, equipping agents with standard desktop computers running low-cost browser software and having microphone and speakers attached thereto would further optimize the cost and maintenance of ACDs. Moreover, connecting callers and distributing related database information to agents over a low-cost network, such as an ethernet, would even further optimize the deployment of ACDs.

It should be further noted that in modern ACD systems of the current art, as many as 80% of all calls are handled robotically by the VRU. It is therefore somewhat paradoxical that although the ACD switch, CT server and agent pool terminals serve only 20% of incoming calls, they are by far the largest cost components of ACD systems. Further, the systems integration problems posed by CT servers are extremely challenging. Clearly, by eliminating the switch and the CT server, and by simplifying deployment of the agent pool network, ACD systems would become much more cost effective.

SUMMARY OF THE INVENTION

These and other objects and features are achieved by one embodiment of the present invention in which a switchless Automatic Call Distribution ("ACD") system distributes incoming calls to call agents networked via a low-cost data network such as an ethernet. Standard POTS calls are received from the Public Switched Telephone Network ("PSTN"), whereupon a POTS/packet gateway digitizes the signal (if necessary) and compresses it, advantageously from $\mu$-law format (64 Kbps) down to approximately 5–6 Kbps. The POTS/packet gateway then converts the signal into a packetized format. Responsive to a call distribution algorithm identifying the next available agent by IP address, the caller's packetized voice signals are distributed to the agent over the ethernet. At the same time, Web-enabled database tools generate "documents," advantageously in html, containing database information regarding the caller. These documents are distributed to the agent over the ethernet. The agent may then converse with the caller using a headset connected to a standard desktop computer running CODEC software to transmit and receive packetized voice signals. At the same time, the computer runs browser software to allow the agent to receive html documents and send back updated information while talking to the caller. As a result, the ACD system has been optimized into a switchless ethernet connecting agents operating standard desktop computers running low-cost CODEC and browser software.

A technical advantage of the present invention is that it eliminates the switch inherent in traditional ACDs.

Another technical advantage of the present invention is that it eliminates the need for agents to have "client" applications software in their data terminals in order to interact with database information during a call. Instead, Web-enabled database tools are used at the server to generate the formatted screens displayed to the agent.

A further technical advantage of the present invention is that deployment of the ACD is dramatically simplified. Systems integration of a CT server is eliminated. Low-cost data networks such as an ethernet are known to be inexpensive and uncomplicated to deploy. Further, most of the enabling architecture of the present invention, such as a VRU, a POTS/packet gateway, a call distribution algorithm, a voice browser controller and an ethernet server, may be conveniently housed in one "box" if desired, located between incoming POTS lines and the ethernet.

A yet further technical advantage of the present invention is that remote call agents may participate in an agent pool using only one phone line (or data line). Under ACDs of the current art, two lines are required: one for the voice path and one for the data path.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
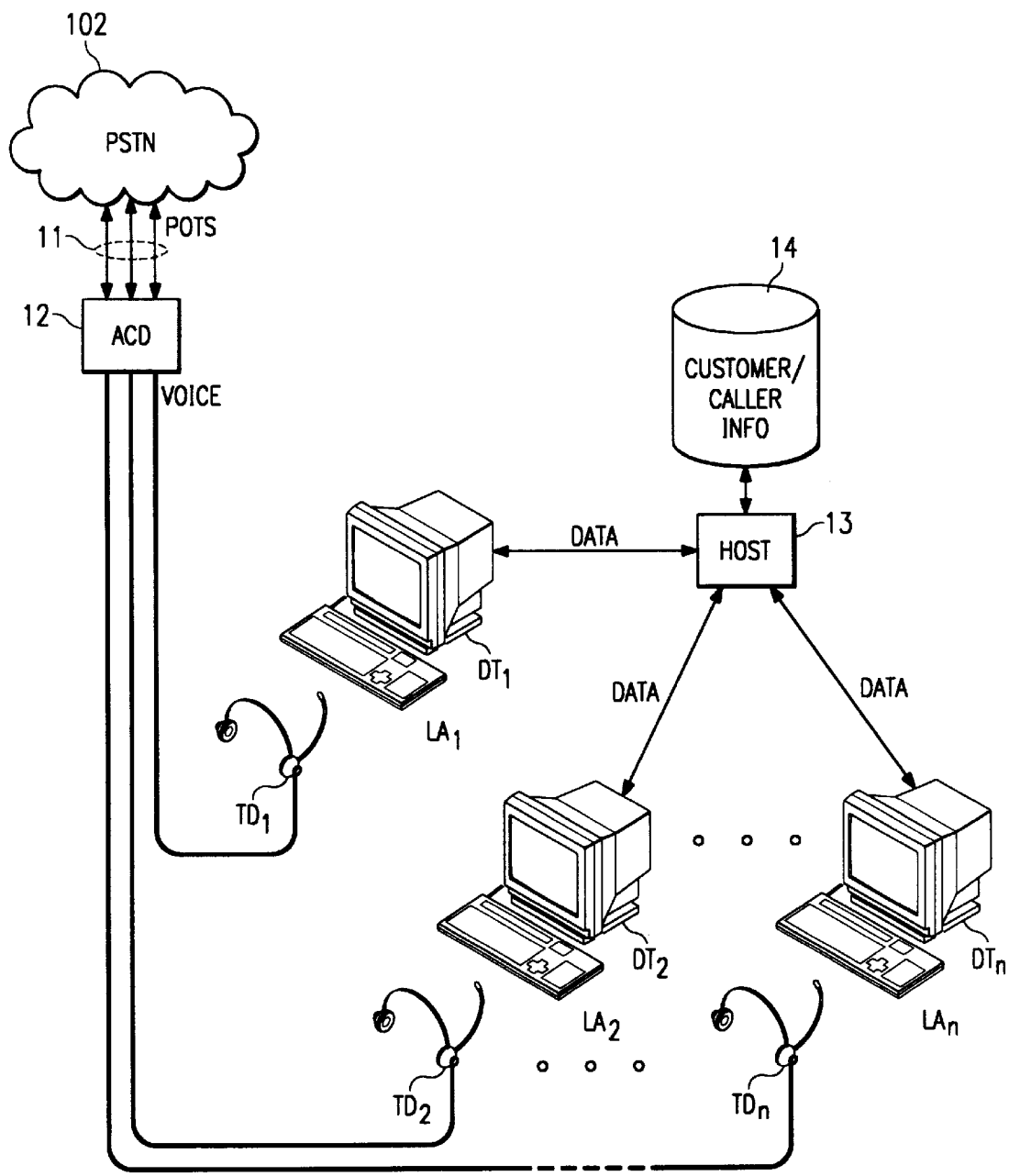
FIG. 1A illustrates exemplary architecture and topology describing an early ACD system of the prior art.

FIG. 1A illustrates architecture and topology embodying an early ACD system of the prior art. POTS lines 11 from PSTN 102 fed into ACD 12, which functioned as little more than a switch, often referred to as a "hunk of iron" in the vernacular of the art. Voice connections through to telephony devices $TD_1$–$TD_n$ of live agents $LA_1$–$LA_n$ were universally analog. ACD 12 distributed calls to live agents $LA_1$–$LA_n$ while agents were available. When all agents were busy, ACD 12 would send a simple message to subsequent callers asking them to hold until an agent was free. Callers could hold or hang up.

When a caller was voice-connected with an agent, the agent's first task was to establish the caller's identity and the nature of the call. Using data terminals $DT_1$–$DT_n$, live agents $LA_1$–$LA_n$ then submitted a request to host 13 for database information 14 on the caller. Data terminals $DT_1$–$DT_n$ were typically "dumb terminals" interacting with a mainframe computer at host 13. Host/terminal hardware, software and network architecture were often proprietary, sometimes integrated with telephony devices $TD_1$–$TD_n$.

Figure 1B:
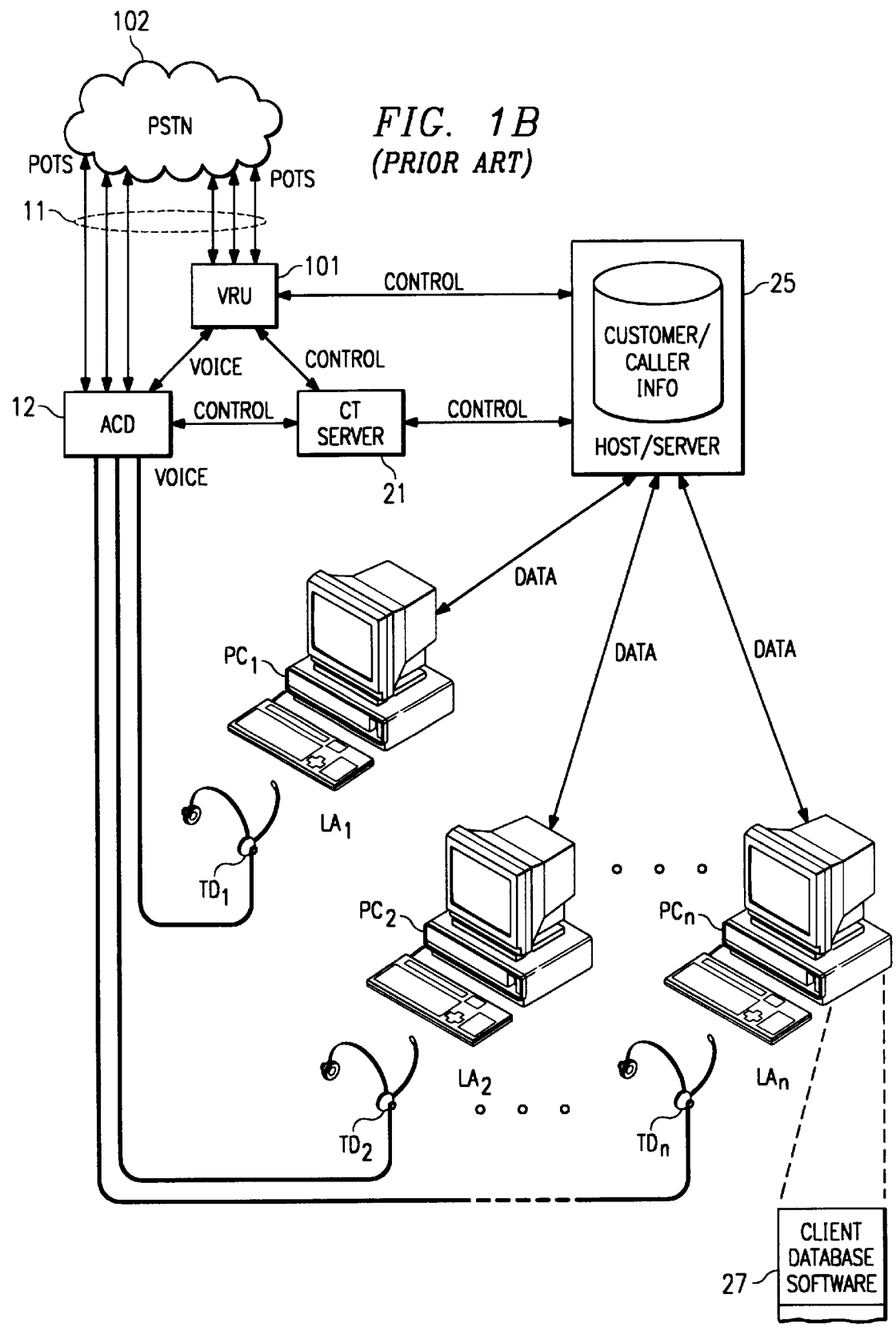
FIG. 1B illustrates exemplary architecture and topology describing a more recent ACD system of the prior art.

More recent ACD systems of the prior art have architecture and topology as illustrated on FIG. 1B. POTS lines 11 from PSTN 102 still feed into ACD 12 directly, but now other lines are first incoming to VRU 101. VRU 101 screens these incoming calls and routes the calls responsive to the callers' needs or wishes. VRU 101 typically plays a recorded greeting and then offers a menu selection to which the caller may respond, for example, by DTMF. Some needs of callers may be able to be satisfied without the need for the caller to speak to a live agent. For example, the caller may simply wish to inquire a bank balance, a function that may be handled robotically by VRU functionality. VRU 101 thus directs and controls robotic functions, and in doing so will normally also identify the caller, preferably by information actually supplied by the caller, or alternatively by ANI (less reliable).

With further reference to FIG. 1B, when a caller indicates to VRU 101 that she desires to speak to a live agent, VRU 101 directs the call to ACD 12. The structure and functionality of ACD 12 as illustrated on FIG. 1B is substantially the same as on FIG. 1A. It is still essentially a "dumb switch" that plays simple greetings and distributes incoming calls to available agents. As described above, it may be a separate "box," or may alternatively be embodied by additional functionality integrated into a PBX.

With further reference to FIG. 1B, ACD 12 controls connections to live agents $LA_1$–$LA_n$ and, upon receipt of a voice signal from VRU 101, selects an available live agent to be connected to a caller according to a predetermined call distribution algorithm. ACD 12 also connects live agents $LA_1$–$LA_n$ to callers who arrive at ACD 12 without being first screened by VRU 101. These connections are analogous to the model described with reference to FIG. 1A.

Focusing now in FIG. 1B on calls passing through VRU 101, contemporaneously with passing a voice signal to ACD 12 for distribution to a live agent $LA_1$–$LA_n$, VRU 101 disposes host/server/database resource to retrieve information regarding the caller. A control link between ACD 12 and CT server 21 also enables host/server/database resource 25 to determine the live agent $LA_1$–$LA_n$ to whom the call will be connected. Host/server/database resource 25 then feeds that information to the personal computer $PC_1$–$PC_n$ of the selected live agent $LA_1$–$LA_n$.

It should be noted at this point that enablement of modern ACD systems of the current art as illustrated on FIG. 1B is often difficult. The regime of control between VRU 101, ACD 12, CT server 21 and host/server/database resource 25 creates some very challenging systems integration problems. In fact, the control links between these components tend to be proprietary among different ACDs of the current art. As a result, ACD systems continue to be expensive and reliant on proprietary systems integration technology.

Finally, on FIG. 1B, it will be seen that host/server/database resource 25 is networked to agents' personal computers $PC_1$–$PC_n$ under a client/server paradigm. As a result, client database software 27 is resident at each personal computer $PC_1$–$PC_n$.

Figure 2:
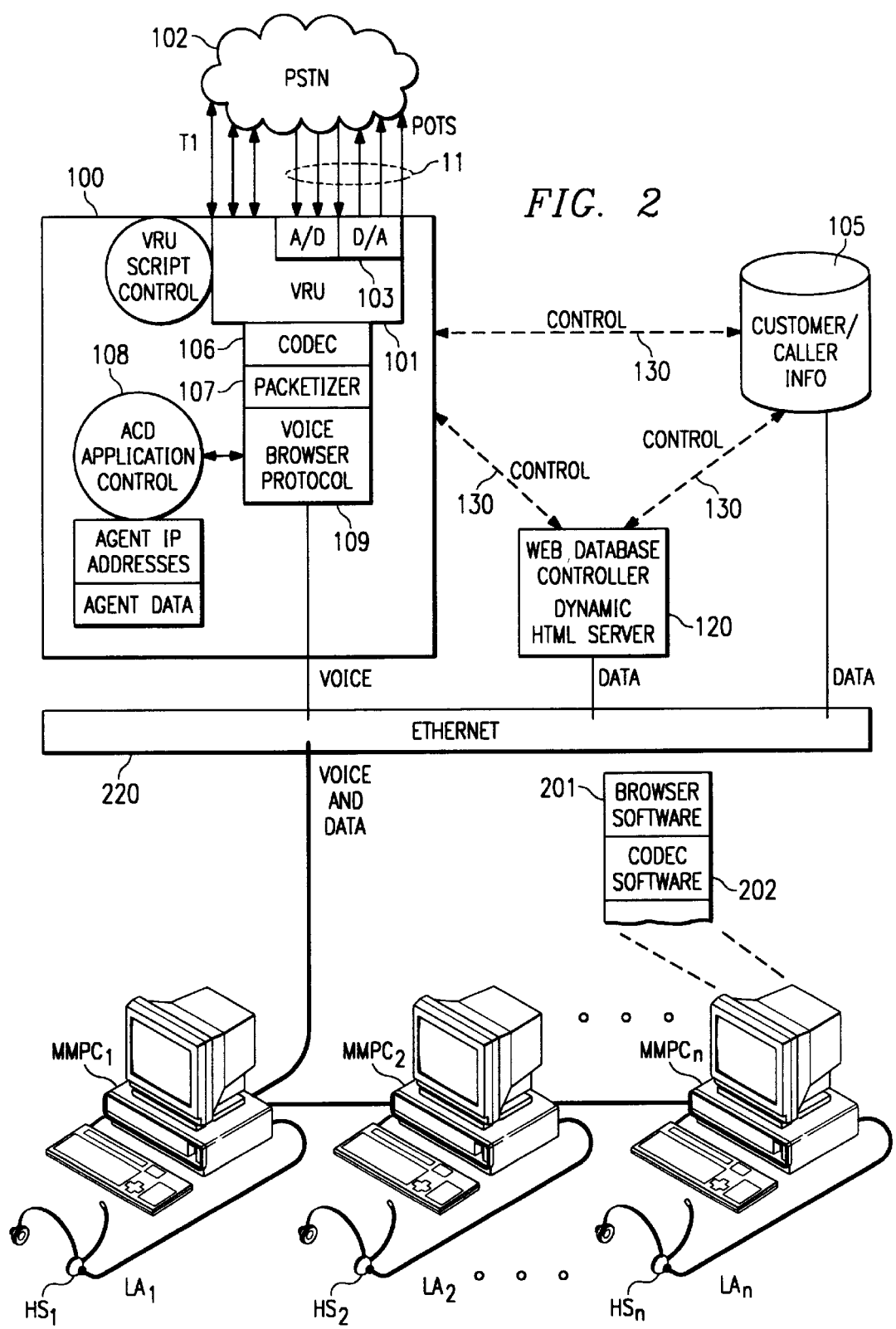
FIG. 2 illustrates architecture and topology of a switchless ACD system according to a preferred embodiment of the present invention.

Turning now to FIG. 2, exemplary architecture and topology embodying the present invention is illustrated. It will be seen immediately in comparison to FIGS. 1A and 1B that the ACD switch 12 is eliminated, and that in the embodiment illustrated in FIG. 2, multimedia grade personal computers $MMPC_1$ through $MMPC_n$ are running browser software 201 and CODEC software 202 instead of client database software 27 as illustrated on FIG. 1B.

Examining the embodiment illustrated in FIG. 2 in more detail, switchless call distribution ("SCD") resource 100 is connected to ethernet 220 and comprises VRU 101 receiving calls from PSTN 102. Where necessary, VRU 101 converts analog voice signals to digital and back again through analog/digital converter functionality 103. VRU 101 screens callers and serves them robotically whenever possible with reference to customer/caller database 105.

When a caller desires to speak to a live agent, however, SCD resource 100 applies POTS/packet gateway technology by first compressing the caller's $\mu$-law encoded voice signal down to 5–6 Kbps (item 106) and then packetizing the signal (item 107) suitable for distribution on a routed network such as ethernet 220.

With further reference to FIG. 2, live agents $LA_1$–$LA_n$ are also connected to ethernet 220 via multimedia grade personal computers $MMPC_1$–$MMPC_n$. Each live agent computer $MMPC_1$–$MMPC_n$ is equipped with audio microphone and speakers as peripheral devices, advantageously as headsets $HS_1$–$HS_n$. Further, each live agent computer $MMPC_1$–$MMPC_n$ runs resident CODEC software compatible with CODEC resource 106 in SCD resource 100.

ACD application control 108 in SCD resource 100 monitors the availability of live agents $LA_1$–$LA_n$ to take calls. It should be noted here that in distinction to ACD switches of the current art illustrated as ACD 12 on FIGS. 1A and 1B, ACD application control 108 is essentially software. When live agents $LA_1$–$LA_n$ log on to make themselves available to receive calls, they send messages including their voice port and data port IP addresses over ethernet 220 to ACD application control 108. Call distribution algorithms in ACD application control 108 determine which of logged-on agents $LA_1$–$LA_n$ is to receive the next call, and the caller's packetized voice signals are directed via voice browser protocol 109 to the voice port IP address of the live agent to receive the call.

These voice signals are received at the voice port IP address of the destination live agent's personal computer $MMPC_1$–$MMPC_n$ and are processed by resident CODEC software 27. The live agent thus comes into voice communication with the caller through headset $HS_1$–$HS_n$. Thus, a voice path is established over ethernet 220 between the caller and a designated live agent.

Meanwhile, VRU 101 has already identified the caller, preferably by robotic inquiry with the caller, but alternatively by ANI (less reliable). Armed with this information and the data port IP address of the destination live agent, SCD resource 100 now disposes web database controller/dynamic html server 120 and customer/caller database 105 to retrieve information regarding the caller and send it via ethernet 220 to the data port IP address of the destination live agent. It should be noted that although FIG. 2 depicts direct control links 130 between SCD resource 100, web database control/dynamic html server 120 and customer/caller database 105, such links are advantageously enabled physically via ethernet 220.

In sending customer/caller information to a live agent, web database controller/dynamic html server 120 automatically generates html documents containing the information using Web-enabled database tools. Server 120 then sends the documents to the destination live agent LA$_1$–LA$_n$ over ethernet 220. Browser software 201 resident on personal computer MMPC$_1$–MMPC$_n$ of the destination live agent then converts the received html documents into graphical presentations, allowing the live agent to interact with customer/caller information while talking to the caller.

Of course, it will be understood that although not specifically illustrated as such on FIG. 2, the invention could still operate according to the "client/server" paradigm, where multimedia PCs MMPC$_1$–MMPC$_n$ run client software to interact with "raw data" distributed by server 120. The arrangement illustrated is considered to be more advantageous, however, in that any person having a multimedia PC, with microphone, speakers, standard browser software and standard CODEC software may potentially be a call agent with the ability to interact with almost any database through standard html documents. This yields economies of standardization.

A further feature of the present invention is that, as illustrated on FIG. 2, ACD application control 108 may also be used to collect information regarding the performance of live agents LA$_1$–LA$_n$. Such agent data may be accumulated in SCD 100 along with information on agents' IP addresses.

It will also be appreciated that although FIG. 2 has illustrated connectivity with ethernet 220, any data grade router-based network, whether LAN-based or WAN-based, will enable the present invention. Even the Internet would enable the present invention, although it is not considered to be particularly reliable or secure.

Although the present invention and its advantages have been described in detail, it should be understood that various changes, substitutions and alterations can be made herein without departing from the spirit and scope of the invention as defined by the appended claims.

I claim:

1. A switchless call distribution system, comprising:
    means for exchanging voice signals between a packetized switchless network and a plurality of remote callers connected in part over the Public Switched Telephone Network (PSTN);
    means for assigning a corresponding agent to communicate with each of the callers;
    means for retrieving selected information associated with ones of the callers, said information retrieved from an information server; and
    means for enabling each agent to converse through a computer with the caller assigned thereto while interacting through the computer with retrieved information associated with the caller assigned thereto, wherein said means for enabling further includes:
        means for generating documents containing said retrieved information in browser-readable format;
        means for concurrently routing each caller's voice signals and browser-readable documents to the corresponding agent's computer over the network, wherein each agent's computer includes means for receiving the voice signals of the caller assigned thereto and for transmitting responsive agent voice signals, and wherein each agent's computer further includes means for displaying browser-readable documents retrieved for the caller assigned thereto and for generating responsive processing;
        means for routing said responsive agent voice signals to the corresponding caller over the network; and
        means for routing said responsive processing to the information server over the network.

2. The switchless call distribution system of claim 1, in which ones of the remote callers are connected in part over Plain Old Telephone Service (POTS) lines.

3. The switchless call distribution system of claim 1, in which ones of the remote callers are connected in part over T1 lines.

4. The switchless call distribution system of claim 1, in which the means for exchanging includes means for converting incoming analog signals to digital signals and means for converting outgoing digital signals to analog signals.

5. The switchless call distribution system of claim 1, in which the means for exchanging includes means for converting incoming streaming signals to packetized signals and means for converting outgoing packetized signals to streaming signals.

6. The switchless call distribution system of claim 1, in which the means for exchanging includes means for compressing incoming signals and means for decompressing outgoing signals.

7. The switchless call distribution system of claim 6, in which incoming signals are compressed from approximately 64 Kbps to approximately 6 Kbps, and in which outgoing signals are decompressed from approximately 6 Kbps to approximately 64 Kbps.

8. The switchless call distribution system of claim 1, in which voice signals from remote callers include $\mu$-law encoded signals.

9. The switchless call distribution system of claim 1, in which the means for exchanging includes a voice response unit (VRU).

10. The switchless call distribution system of claim 1, in which the means for exchanging includes a voice browser protocol.

11. The switchless call distribution system of claim 1, in which the packetized switchless network is selected from the group consisting of:
    (a) an ethernet;
    (b) the Internet;
    (c) a Local Area Network; and
    (d) a Wide Area Network.

12. The switchless call distribution system of claim 1, further comprising means for identifying the callers.

13. The switchless call distribution system of claim 12, in which the means for identifying is operable using Automatic Number Identification (ANI).

14. The switchless call distribution system of claim 12, in which the means for identifying is operable using robotic interrogation of the callers by a Voice Response Unit (VRU).

15. The switchless call distribution system of claim 1, in which agent computers run browser software and CODEC software.

16. The switchless call distribution system of claim 1, in which agents converse with callers via microphones and speakers coupled to said conversing agents' computers.

17. The switchless call distribution system of claim 1, in which each agent has a unique Internet Protocol (IP) address, and in which agents, by notifying the means for assigning of their IP addresses, thereby make themselves available to be assigned callers.

18. The switchless call distribution system of claim 1, in which the means for assigning is operable using a predetermined Automatic Call Distribution (ACD) algorithm.

19. The switchless call distribution system of claim 1, in which the information server is coupled to a data source.

20. The switchless call distribution system of claim 1, in which said browser-readable documents are in Hyper Text Markup Language (HTML).

21. The switchless call distribution system of claim 1, in which said browser-readable documents are generated by web-enabled database tools.

22. The switchless call distribution system of claim 21, in which said web-enabled database tools are resident at the information server.

23. The switchless call distribution system of claim 1, in which the means for exchanging and the means for assigning are combined into a Switchless Call Distribution (SCD) resource, the SCD resource including a VRU, an ACD application control, a CODEC, a packetizer and a voice browser protocol, and in which control links between the SCD resource and the information server are enabled via the network.

24. The switchless call distribution system of claim 1, in which the information server includes a web database controller and a dynamic HTML server.

25. A switchless call distribution system, comprising:
   a packetized switchless network selected from the group consisting of:
      (a) an ethernet;
      (b) the Internet,
      (c) a Local Area Network; and
      (d) a Wide Area Network;
   a Switchless Call Distribution (SCD) resource, the SCD coupled to the network, the SCD resource including a Voice Response Unit (VRU), an Automatic Call Distribution (ACD) application control, a CODEC, a packetizer and a voice browser protocol;
   a plurality of agents each operating an agent computer coupled to the network, each agent computer identifiable on the network by a unique Internet Protocol (IP) address, each agent computer further running browser software and CODEC software, each agent computer further having a microphone and speakers coupled thereto;
   means for exchanging voice signals via the SCD and over the network between a plurality of remote callers connected in part over the Public Switched Telephone Network (PSTN) and the agent computers of selected agents assigned to said callers, said assignment enabled by the SCD according to a predetermined ACD algorithm,
   the SCD further including means for obtaining indexing information from said remote callers, the means for obtaining operable using an information gathering method selected from the group consisting of (1) Automatic Number Identification (ANI) and (2) robotic interrogation of callers by the VRU; and
   an information server coupled to a data source, the information server including web-enabled database tools, a web database controller and a dynamic Hyper Text Markup Language (HTML) server, the information server operable to create browser-readable HTML documents from data in the data source responsive to said indexing information, the information server further operable to distribute said browser-readable documents to selected agent computers over the network according to IP address thereof, said distribution corresponding to said assignment of agents to callers.

26. A method for distributing calls to agents in a switchless environment, comprising the steps of:
   (a) exchanging voice signals between a packetized switchless network and a plurality of remote callers connected in part over the Public Switched Telephone Network (PSTN);
   (b) assigning a corresponding agent to communicate with each of the callers;
   (c) retrieving selected information associated with ones of the callers, said information retrieved from an information server; and
   (d) enabling each agent to converse through a computer with the caller assigned thereto while interacting through the computer with retrieved information associated with the caller assigned thereto, wherein said enabling step includes the substeps of:
      (1) generating documents containing said retrieved information in browser-readable format;
      (2) coupling each agent's computer to the network;
      (3) concurrently routing each callers voice signals and browser-readable documents to the corresponding agent's computer over the network;
      (4) at each agent's computer, receiving the voice signals of the caller assigned thereto and transmitting responsive agent voice signals;
      (5) at each agent's computer, displaying browser-readable documents retrieved for the caller assigned thereto and generating responsive processing;
      (6) routing said responsive agent voice signals to the corresponding caller over the network; and
      (7) routing said responsive processing to the information server over the network.

27. The method of claim 26, in which ones of the remote callers are connected in part over Plain Old Telephone Service (POTS) lines.

28. The method of claim 26, in which ones of the remote callers are connected in part over T1 lines.

29. The method of claim 26, in which said exchanging step includes the substeps of converting incoming analog signals to digital signals and converting outgoing digital signals to analog signals.

30. The method of claim 26, in which said exchanging step includes the substeps of converting incoming streaming signals to packetized signals and converting outgoing packetized signals to streaming signals.

31. The method of claim 26, in which said exchanging step includes the substeps of compressing incoming signals and decompressing outgoing signals.

32. The method of claim 31, in which incoming signals are compressed from approximately 64 Kbps to approximately 6 Kbps, and in which outgoing signals are decompressed from approximately 6 Kbps to approximately 64 Kbps.

33. The method of claim 26, in which voice signals from remote callers include $\mu$-law encoded signals.

34. The method of claim 26, in which the packetized switchless network is selected from the group consisting of:
   (a) an ethernet;
   (b) the Internet;

(c) a Local Area Network; and (d) a Wide Area Network.

35. The method of claim 26, further comprising the step of identifying the callers.

36. The method of claim 35, in which said identifying step is accomplished using Automatic Number Identification (ANI).

37. The method of claim 35, in which said identifying step is accomplished using interrogation of the callers by a Voice Response Unit (VRU).

38. The method of claim 26, in which agent computers run browser software and CODEC software.

39. The method of claim 26, in which agents converse with callers via microphones and speakers coupled to said conversing agents' computers.

40. The method of claim 26, in which each agent has a unique Internet Protocol (IP) address, and in which agents are assigned to callers by IP address.

41. The method of claim 26, in which said assigning step is accomplished using a predetermined Automatic Call Distribution (ACD) algorithm.

42. The method of claim 26, in which the information server is coupled to a data source.

43. The method of claim 26, in which said browser-readable documents are in Hyper Text Markup Language (HTML).

44. The method of claim 26, in which said browser-readable documents are generated by web-enabled database tools.

45. The method of claim 44, in which said web-enabled database tools are resident at the information server.

46. A call handling system comprising:

a data network providing packetized data communication;

a call distribution resource coupled to said data network via a network interface of said call distribution resource, wherein said call distribution resource provides a voice signal interface between call systems of the call distribution resource communicating via packetized data signals and remote callers coupled to said call distribution resource via the public switched telephone network (PSTN), wherein said call systems of said call distribution resource include a voice response unit (VRU), an automatic call distribution (ACD) application, and said network interface;

a plurality of agent computers coupled to said data network, each agent computer identifiable on the network by a unique address, each agent computer running an agent call system operable to interface a live agent operating a corresponding one of said agent computers with a particular caller of said remote callers, wherein interfacing said live agent with said particular caller includes exchanging voice signals between said live agent and said particular caller via said data network and said network interface of said call distribution resource, said agent call system being further operable to interface said live agent with an information server coupled to said agent computer via said data network;

wherein said agent call system comprises browser software and CODEC software, wherein said browser software is utilized in said interfacing said live agent with said information server, and wherein said CODEC software is utilized in said interfacing said live agent with said particular caller; and wherein said information server comprises web-enabled database tools, a web database controller and a dynamic Hyper Text Markup Language (HTML) server, the information server operable to create browser-readable HTML documents from data in a data source responsive to caller indexing information, the information server further operable to distribute said browser-readable documents to selected agent computers over said data network, said distribution corresponding to assignment of said live agents to callers by said ACD application.

47. The system of claim 46, wherein said data network comprises a network selected from the group consisting of:

an Ethernet network;

the Internet;

a local area network; and a wide area network.

48. The system of claim 46, wherein said call distribution resource including said voice response unit (VRU), said automatic call distribution (ACD) application, and said network interface are housed in a common box.

49. The system of claim 46, wherein said call distribution resource comprises:

an index information system operable to obtain indexing information from ones of said remote callers and for communicating said indexing information over said data network.

50. The system of claim 49, wherein said index information system is adapted to obtain said indexing information through the use of robotic interrogation of callers by said VRU call system.

51. The system of claim 49, wherein said index information system is adapted to obtain said indexing information through the use of automatic number identification (ANI).

* * * * *